Figure 1:
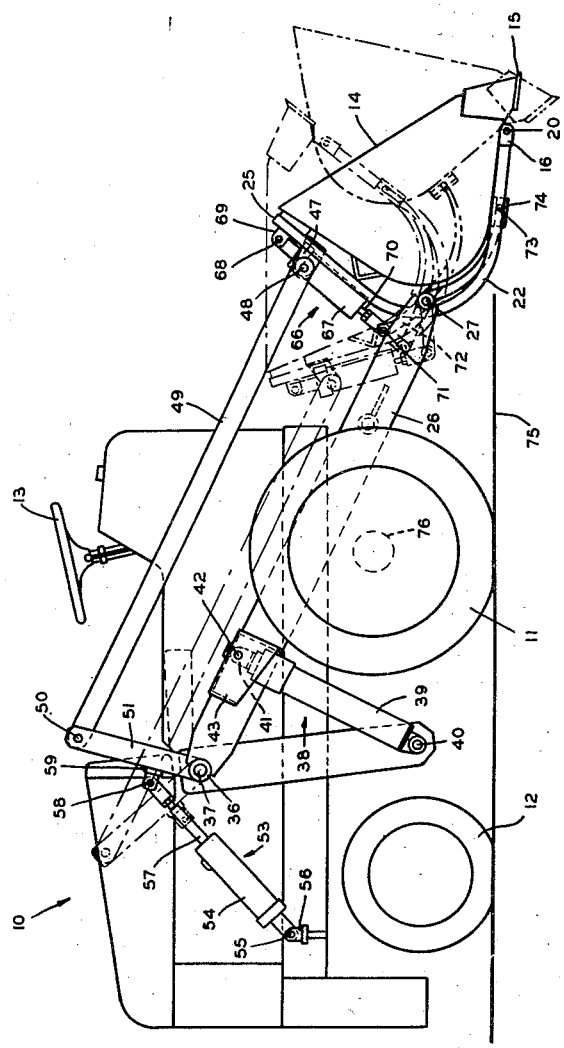

Dec. 11, 1956 R. E. BURRUS 2,773,613
TRACTOR SHOVEL
Filed March 26, 1953 3 Sheets-Sheet 1

INVENTOR.
ROBERT E. BURRUS
BY
ATTYS.

Dec. 11, 1956 R. E. BURRUS 2,773,613
TRACTOR SHOVEL
Filed March 26, 1953 3 Sheets-Sheet 3

INVENTOR.
ROBERT E. BURRUS
BY
ATTYS.

United States Patent Office 2,773,613
Patented Dec. 11, 1956

2,773,613

TRACTOR SHOVEL

Robert E. Burrus, Buchanan, Mich., assignor to Clark Equipment Company, a corporation of Michigan Application March 26, 1953, Serial No. 344,695

8 Claims. (Cl. 214—140)

My present invention relates generally to tractor shovels, and, more specifically, is directed to a tractor shovel dumping mechanism.

The present invention is an improvement over my copending application, Serial No. 292,076, filed June 6, 1952 and relates to the class of power actuated shovels wherein each may be selectively raised and lowered at the forward end of a vehicle, and tilted forwardly and rearwardly, as conditions of operation require.

The invention of my copending application comprises a shovel disposed at the forward end of a truck with parallelogram linkage means being pivoted at the rear end to the truck and at the forward end to the shovel. In order to raise and lower the shovel, power actuated means is provided for effecting pivotal movement of the linkage means relative to the truck. Parallelogram type linkage means is employed in order that a section of the shovel cut by any given horizontal plane will remain substantially parallel to the ground during vertical movement of the shovel. In addition, second power actuated means is arranged between the truck and the linkage means and the second power actuated means is adapted to shift a portion of the linkage means longitudinally to effect pivotal movement of the shovel relative to the ground.

It is an object of my present invention to provide a tractor shovel dumping mechanism of the general character described above which has a longer reach and a higher lift than existing dumping mechanisms employing linkage means of comparable extent.

The improvement of my present invention resides primarily in pivotally mounting the forward end of the linkage means to a shovel carriage to which the lower leading edge of a shovel is pivotally mounted. In addition, third power actuated means is connected to the shovel carriage, and the third power actuated means, is adapted to effect, through suitable linkage means, tilting of the shovel relative to the shovel carriage.

In the operation of my present invention, the first power actuated means accomplishes raising and lowering of the shovel carriage and shovel by effecting pivotal movement of the linkage means which extends between the truck and the shovel carriage. The second power actuated means provides for tilting of the shovel carriage and the shovel, while the third power actuated means provides for additional tilting of the shovel relative to the shovel carriage. By virtue of the fact that the shovel is pivotally mounted, at its lower leading edge, to the shovel carriage, the dumping mechanism has a longer reach and a higher lift than have known mechanisms wherein comparable linkage means is employed between the truck and the shovel.

It is a further object of my present invention to provide a power actuated shovel, as noted, which is simple in structure, efficient in operation and inexpensive to manufacture and maintain.

Now, in order to acquaint those skilled in the art with the manner of constructing and using power actuated shovels in accordance with the principles of my present invention, I shall describe in connection with the accompanying drawings, a preferred embodiment of my present invention.

Figure 2:
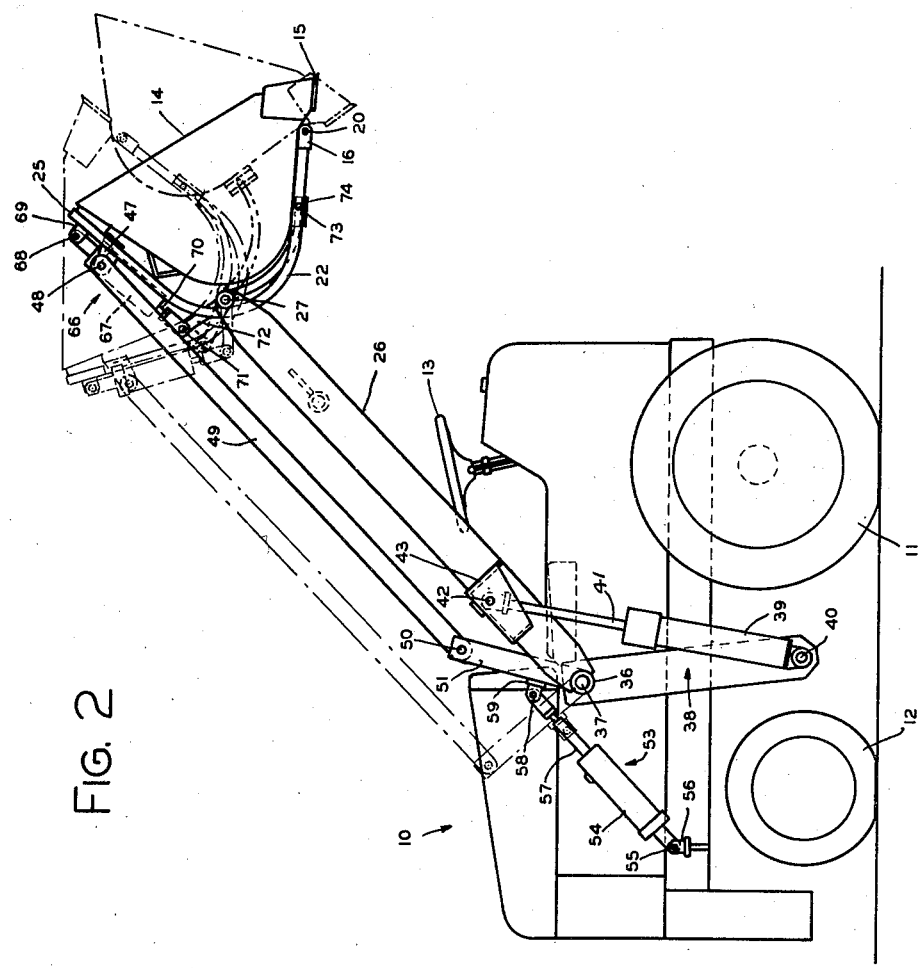
Figure 3:
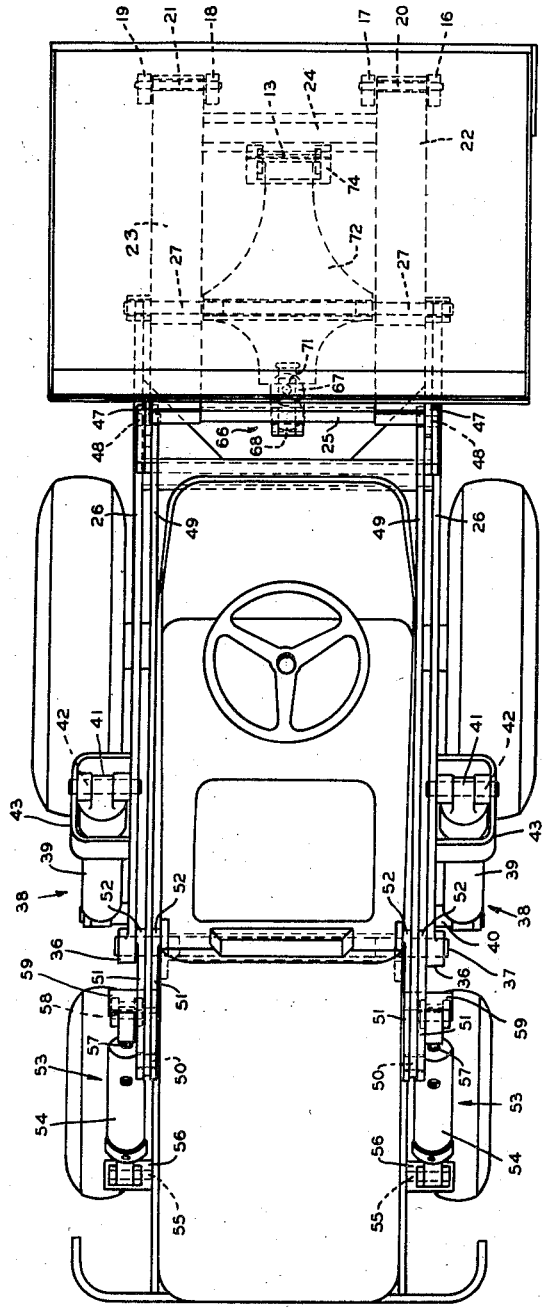

In the drawings:

Figures 1 and 2 are side elevational views of an industrial truck and the power actuated shovel of my present invention with the latter being shown in various operating positions; and Figure 3 is a plan view of the truck and shovel shown in Figures 1 and 2.

Referring now to the drawings, there is indicated generally by the reference numeral 10 an industrial truck having forward drive wheels 11 and rear steering wheels 12. The truck 10 is further provided with a hand steering wheel 13 which has connection, through suitable linkage means, with the rear steering wheels 12. Suitable prime mover means, not shown, is provided for driving the forward drive wheels 11.

A shovel or scoop member 14 is disposed at the forward end of the truck 10 and extends transversely thereof. The shovel 14 is preferably provided with a leading edge 15 for a purpose to be described more fully hereinafter. Immediately rearwardly of the leading edge 15, the shovel 14 is provided with transversely spaced flange members 16, 17, 18 and 19. Pin members 20 and 21, respectively, are mounted, at their ends, in the flange members 16 and 17, and flange members 18 and 19. Pivotally mounted on the pin members 20 and 21 are the forward ends of transversely spaced substantially U-shaped yoke members 22 and 23 which are maintained in spaced relation by means of strap members 24 and 25. The yoke members 22 and 23 and the strap members 24 and 25 serve to define what I term a shovel carriage. From the foregoing description, it will be apparent to those skilled in the art that the shovel 14 may be pivoted relative to the shovel carriage about a transverse axis coinciding with the axes of the pin members 20 and 21.

First arm members 26 extend longitudinally of the truck 10 at each side thereof and are journaled at their forward ends on the laterally outwardly projecting ends of pin members 27 which are secured respectively to the yoke members 22 and 23 transversely thereof. The arm members 26, at their rear ends, are suitably secured, as by welding, to sleeve members 36 which are journaled on the ends of a shaft 37 extending transversely of the truck 10.

Pivotal movement of the arm members 26 about the shaft 37 is effected by means of a pair of hydraulic piston and cylinder assembly means indicated generally at 38. The hydraulic assemblies 38 each comprise a cylinder 39 pivoted, at the lower end thereof, on a shaft 40 extending transversely of the truck 10. The assemblies 38 further each comprise piston rods 41 which, at their outer ends, are pivoted on stub shafts 42 carried by bracket members 43 secured to the outwardly facing sides of the arm members 26. The lower ends of the cylinders 39 are adapted for the admission of fluid under pressure through suitable hose lines (not shown) for effecting outward movement of the piston rods 41 and counterclockwise movement of the arm members 26. By bleeding fluid from the lower ends of the cylinders 39, the force supporting the piston rods 41 is removed and the weight of the arm members 26 will cause clockwise movement thereof. The shovel carriage and the shovel 14 are raised and lowered during pivotal movement of the arm members 26.

I shall now describe the linkage means, and actuating means therefor, by which the shovel carriage and shovel 14 may be selectively tilted forwardly and rearwardly. Extending rearwardly from the yoke members 22 and 23, at the outwardly facing sides thereof, are bracket members 47. Pivotally mounted about pins 48, carried at the rear ends of the bracket members 47, are the forward bifurcated ends of second arm members 49 which are located above and parallel to the first arm members 26. The rear ends of the second arm members 49 are pivotally mounted on pin members 50 which are each carried by the upper ends of a pair of link members 51. The link members 51, at their other ends, are secured to sleeve members 52 which are journaled on the shaft 37 inwardly of the aforenoted sleeve members 36.

Tilting of the shovel 14, through one range of movement, is effected by forward and rearward movement of the second arm members 49. Such movement is effected in the preferred embodiment of my present invention by means of hydraulic piston and cylinder assembly means indicated generally by the reference numerals 53. The power actuated means 53 each comprise a cylinder 54 which is pivotally mounted on a pin member 55 suitably secured in bracket assemblies indicated generally at 56. The bracket assemblies 56 are, in turn, secured to the truck 10. The hydraulic actuating means 53 further each comprise piston rods 57, which, at their outer ends, are pivotally mounted by means of pins 58, to brackets 59 secured to the link members 51 intermediate of the ends thereof.

I shall now describe the means provided for tilting the shovel 14 relative to the shovel carriage. A hydraulic piston and cylinder assembly, indicated generally by the reference numeral 66, is disposed in the median plane of the truck 10 and comprises a cylinder 67 which is secured by means of a pin member 68 to bracket means 69 suitably secured to the rear upper surface of the transverse plate member 25 of the shovel carriage. The hydraulic assembly 66 further comprises a piston rod 70 which is pivotally mounted, by means of a pin 71, to the one end of a bell crank 72. The bell crank 72, intermediate of its ends, is pivotally mounted on the laterally inwardly projecting ends of the aforedescribed pin members 27 which are carried by the yoke members 22 and 23 of the shovel carriage. The other end of the bell crank 72, has secured thereto, a pin member 73, which is mounted for sliding movement in a slotted member 74 suitably secured to the underside of the shovel 14.

When fluid under pressure is admitted to the upper end of the cylinder 67 of the hydraulic actuating assembly 66, the piston rod 70 is extended thereby causing counterclockwise pivotal movement of the bell crank 72 which effects, through the pin and slot connection with the shovel 14, pivotal movement of the shovel in a clockwise direction. When fluid is bled from the upper end of the cylinder 67 and fluid under pressure is admitted to the lower end of the cylinder 67, the piston rod 70 is retracted thereby causing clockwise pivotal movement of the bell crank 72 and counterclockwise pivotal movement of the shovel 14.

In the operation of the power actuated shovel of my present invention, the truck 10 is driven to the location where a load is to be engaged and the shovel 14 positioned in front of the load. Assuming that loose material is to be picked up, fluid under pressure is admitted to the lower ends of the cylinders 54 so as to extend the piston rods 57. With the actuating assemblies 38, 53 and 66 disposed in the position shown in solid lines in Figure 1, the shovel 14 will be disposed in the position shown in solid lines. The truck 10 is then driven forward causing the leading edge 15 of the shovel 14 to bite into the loose material. After sufficient material has been received in the shovel 14, fluid under pressure is admitted to the upper ends of the cylinders 54 of the hydraulic actuating assemblies 53 thereby causing the piston rods 57 to be retracted inwardly of the cylinders 54. As the piston rods 57 are retracted, the upper arm members 49 are caused to be moved rearwardly thereby tilting the shovel carriage and shovel 14 to the dot-dash line position shown in Figure 1.

The shovel may now be raised for transporting the load by admitting fluid under pressure to the lower ends of the cylinders 39 of the hydraulic actuating assemblies 38. The piston rods 41 are extended thereby causing the arm members 26 and 49, the shovel carriage and the shovel 14, to be elevated to the position shown in Figure 2. Due to the fact that the shovel 14 is mounted to the truck through parallelogram type linkage, a section of the shovel 14 cut by any given horizontal plane, will remain substantially parallel to the ground during vertical movement of the shovel 14. Thus, loads engaged by the shovel 14 while in a lowered position, will not be dumped or spilled during raising of the shovel.

At the location where the load is to be deposited, the piston rods 57 of the actuating assemblies 53 may be extended for tilting the shovel 14 from the dot-dash line position of Figure 2 to the solid line position. In the solid line position of the shovel, a portion only of its contents will be dumped. If the entire contents of the shovel are to be dumped, the piston rod 70 of the hydraulic actuating assembly 66 is extended thereby causing counterclockwise movement of the bell crank 72 and clockwise pivotal movement of the shovel 14, relative to the shovel carriage, from the solid line position to the dash-double dot line position.

If it should be desired to use the shovel for scraping purposes or digging into relatively hard material, the actuating assemblies 38, 53 and 66 may be suitably actuated for disposing the shovel 14 in the dash-double dot line position shown in Figure 1. With the shovel in this position, the leading edge 15 provides a cutting edge for scraping or biting into hard material. My improved construction provides a rigid cutting edge since the edge 15 is close to the pivot axis through pins 20 and 21.

In addition, it is to be noted that the leading edge 15 is below the normal ground surface 75 in Fig. 1. Moreover, with the tractor shovel illustrated in the drawing, the shovel will go still lower than the dash-double dot position of Fig. 1, the downward movement being limited by the engagement of arms 26 with axle 76 on which wheels 11 are mounted. In this connection it should be understood that when actuating assembly 38 is operated to allow the arms 26, the linkage means, the shovel carriage and the shovel to lower from an elevated position that ordinarily they move downwardly until the shovel 14 contacts a surface or arms 26 engage axle 76.

The hydraulic assemblies 53 and 66 may be actuated either independently or simultaneously, thus making it possible to position the shovel 14 in one of three positive positions. In effecting movement of the shovel 14 between its three normal operating positions, no "feathering" of the movement is required and, thus, the operator's task of positioning the shovel is simplified. It is to be understood, of course, that if an intermediate position of the shovel 14 is desired, such intermediate position may be obtained by a suitable "feathering" operation of the control valve or valves for the hydraulic motors. By feathering is meant operation with the control valve or valves open only slightly, so that the motors move slowly and can be stopped readily at a desired intermediate location.

Since the shovel 14 is pivotally mounted adjacent its lower leading edge to the shovel carriage, the dumping mechanism has a longer reach and a higher lift than have known dumping mechanisms wherein comparable arm and linkage means are employed between the tractor and the shovel.

Now, while I have shown and described what I believe to be a preferred embodiment of my present invention, it will be understood that various modifications and rearrangements may be made therein without departing from the spirit and scope of my present invention.

I claim:

1. For use with an industrial truck, the combination of a shovel having a lower leading edge, a shovel carriage on which the said shovel is pivotally mounted adjacent the said lower leading edge of the shovel, means for pivoting said shovel relative to said shovel carriage, arm means pivoted at one end to the truck and at the other end to said shovel carriage, first power actuated means carried by the truck and having connection with said arm means for effecting pivotal movement of the latter whereby said shovel carriage and shovel may be raised and lowered, second power actuated means carried by the truck, and linkage means between said second power actuated means and said shovel carriage whereby upon actuation of said second power actuated means said shovel carriage and shovel may be tilted forwardly and rearwardly.

2. For use with an industrial truck, the combination of a shovel having a lower leading edge, a shovel carriage on which said shovel is pivotally mounted, the pivotal connection between the said carriage and the said shovel being adjacent the said lower leading edge of the shovel, said shovel carriage being disposed at the forward end of the truck, forwardly extending parallelogram linkage means pivoted at the rear end to the truck and at the forward end to said shovel carriage, first power actuated means carried by the truck and having connection with said linkage means for effecting pivotal movement of the latter whereby said shovel carriage and shovel may be raised and lowered, and second power actuated means carried by the truck and having connection with said linkage means for shifting a portion of the latter longitudinally whereby said shovel carriage and shovel may be tilted forwardly and rearwardly.

3. For use with an industrial truck, the combination of a shovel, a shovel carriage to which said shovel is pivotally mounted, arm means pivoted at one end to the truck and at the other end to said shovel carriage, first power actuated means carried by the truck and having connection with said arm means for effecting pivotal movement of the latter whereby said shovel carriage and shovel may be raised and lowered, second power actuated means carried by the truck, linkage means between said second power actuated means and said shovel carriage whereby upon actuation of said second power actuated means said shovel carriage and shovel may be tilted forwardly and rearwardly, third power actuated means carried by said shovel carriage, and linkage means between said third power actuated means and said shovel whereby upon actuation of said third power actuated means said shovel may be tilted forwardly and rearwardly relative to said shovel carriage.

4. For use with an industrial truck, the combination of a shovel, a shovel carriage to which said shovel is pivotally mounted, arm means pivoted at one end to the truck and at the other end to said shovel carriage, first power actuated means carried by the truck and having connection with said arm means for effecting pivotal movement of the latter whereby said shovel carriage and shovel may be raised and lowered, second power actuated means carried by the truck, linkage means between said second power actuated means and said shovel carriage whereby upon actuation of said second power actuated means said shovel carriage and shovel may be tilted forwardly and rearwardly, third power actuated means carried by said shovel carriage, bell crank means pivotally mounted to said shovel carriage and having connection at one end with said third power actuated means and at the other end with said shovel, and said third power actuated means being adapted to act through said bell crank to effect tilting of said shovel forwardly and rearwardly relative to said shovel carriage.

5. For use with an industrial truck, the combination of a shovel having a lower leading edge, a shovel carriage to which the lower leading edge of said shovel is pivotally mounted, first forwardly extending arm means pivoted at the rear end to the truck and at the forward end to said shovel carriage, first hydraulic piston and cylinder assembly means carried by the truck and having connection with said first arm means for effecting pivotal movement of the latter whereby said shovel carriage and shovel may be raised and lowered, second arm means extending parallel to and above said first arm means, said second arm means at the forward end being pivoted to said shovel carriage, link means pivotally connected at one end to the rear end of said first arm means and at the other end to the rear end of said second arm means, second hydraulic piston and cylinder assembly means carried by the truck and having connection with said link means for effecting pivotal movement of the latter whereby said second arm means may be moved fore and aft for tilting said shovel carriage and shovel forwardly and rearwardly, third hydraulic piston and cylinder assembly means carried by said shovel carriage, a bell crank pivotally mounted to said shovel carriage and at one end having a floating connection with said shovel, and said third hydraulic piston and cylinder assembly means having connection with the other end of said bell crank for effecting pivotal movement of the latter whereby said shovel may be tilted forwardly and rearwardly relative to said shovel carriage.

6. A mechanism for a tractor shovel comprising, arm means connected at one end thereof to the tractor, first power actuated means connected between the tractor and said arm means for effecting pivotal movement of the arm means, a shovel carriage pivotally mounted on the other end of said arm means whereby said shovel carriage may be raised and lowered by movement of the arm means, linkage means connected between the tractor and said shovel carriage for controlling the position of the shovel carriage as the said arms are raised and lowered, second power actuated means connected between the tractor and the said linkage means for pivoting the said shovel carriage with respect to the said arm means, a shovel carried by said carriage, said shovel having a horizontally disposed leading edge and said shovel being pivotally connected to the said carriage adjacent the said leading edge of the shovel, and third power actuated means connected between said carriage and said shovel for pivoting the shovel with respect to the carriage.

7. A tractor shovel comprising, a pair of forwardly extending arms pivotally connected at one end of the arms to the tractor respectively on opposite sides thereof, a first pair of hydraulic cylinder and piston assemblies connected respectively between the said arms and the tractor for raising and lowering the arms, a shovel carriage pivotally mounted on the other end of said arms whereby said shovel carriage is raised and lowered by movement of the arms, a pair of linkages disposed respectively on opposite sides of the tractor and connected between said shovel carriage and the tractor for stabilizing the shovel carriage during movement of the said arms, a second pair of hydraulic cylinder and piston assemblies connected respectively between said linkages and the tractor for moving the linkages and thereby pivoting the shovel carriage with respect to the said arms, a transversely disposed shovel carried by the said carriage, said shovel having a horizontally disposed leading edge and said shovel being pivotally connected to the said carriage adjacent the said leading edge of the shovel, and a hydraulic cylinder and piston assembly connected between said carriage and said shovel for pivoting the shovel with respect to the carriage.

8. A tractor shovel comprising, a pair of forwardly extending arms pivotally connected at one end of the arms to the tractor respectively on opposite sides thereof, a first pair of hydraulic cylinder and piston assemblies connected respectively between the said arms and the tractor for raising and lowering the arms, a shovel carriage pivotally mounted on the other end of said arms whereby said shovel carriage is raised and lowered by movement of the arms, a pair of linkages disposed respectively on opposite sides of the tractor and connected between said shovel carriage and the tractor for stabilizing the shovel carriage during movement of the said arms, a second pair of hydraulic cylinder and piston assemblies connected respectively between said linkages and the tractor for moving the linkages and thereby pivoting the shovel carriage with respect to the said arms, a transversely disposed shovel carried by the said carriage, said shovel having a horizontally disposed leading edge and said shovel being pivotally connected to the said carriage adjacent the said leading edge of the shovel, bell crank means connected between said carriage and said shovel for pivoting the shovel with respect to the carriage, and a hydraulic cylinder and piston assembly connected to the said bell crank means and to said shovel carriage for performing the said pivoting operation of the shovel.

References Cited in the file of this patent

UNITED STATES PATENTS

| | | |
|---|---|---|
| 947,964 | Collins et al. | Feb. 1, 1910 |
| 2,412,323 | Conrad | Dec. 10, 1946 |
| 2,426,544 | Wooldridge | Aug. 26, 1947 |
| 2,449,279 | Conklin | Sept. 14, 1948 |
| 2,603,374 | McNamara | July 15, 1952 |
| 2,619,244 | Smith | Nov. 25, 1952 |
| 2,683,542 | Baker | July 13, 1954 |
| 2,707,056 | Gerst | Apr. 26, 1955 |

FOREIGN PATENTS

| | | |
|---|---|---|
| 870,975 | Germany | Mar. 19, 1953 |